United States Patent [19]
Jäger et al.

[11] Patent Number: 5,951,125
[45] Date of Patent: Sep. 14, 1999

[54] ROLLER BELT ARRANGEMENT FOR ENDLESS TRACK VEHICLES ESPECIALLY SNOWMOBILES

[75] Inventors: Arnold Jäger, Gehrbergsweb 6, D-30303 Burgdorf, Germany; Claudius Jäger, Lafayette, Colo.; Sebastian Jäger, Hannover, Germany

[73] Assignee: Arnold Jäger, Burgdorf, Germany

[21] Appl. No.: 08/853,648

[22] Filed: May 9, 1997

[30] Foreign Application Priority Data

May 10, 1996 [DE] Germany ............... 296 08 376 U

[51] Int. Cl.⁶ .................................................. B62D 55/26
[52] U.S. Cl. ................................... 305/180; 305/181
[58] Field of Search ......................... 305/165, 180, 305/181, 161, 162, 187

[56] References Cited

U.S. PATENT DOCUMENTS

| | | | |
|---|---|---|---|
| 2,064,890 | 12/1936 | Dorst | 305/180 |
| 3,829,174 | 8/1974 | Thomas | 305/181 |
| 4,086,947 | 5/1978 | Payne | 305/180 X |
| 5,201,574 | 4/1993 | James et al. | 305/181 X |
| 5,265,949 | 11/1993 | Haug | 305/180 X |

*Primary Examiner*—Russell D. Stormer
*Attorney, Agent, or Firm*—Robert W. Becker & Associates

[57] ABSTRACT

A roller belt arrangement for a CATERPILLAR (endless track) vehicle has at least one pull resistant belt having a first surface and a second surface opposite the first surface. Drive members are connected to the first surface of the at least one pull resistant belt and extend transversely to a longitudinal extension of the at least one pull-resistant belt. The drive members have a U-shaped foot comprising a stay and two legs, wherein the stay rests on the first surface and the legs project perpendicularly from the first surface. The bolts, having a head and a threaded end opposite the head, are provided for connecting the drive members to the at least one pull-resistant belt. Plate members are non-rotatably positioned between the legs. The bolts penetrate the at least one belt, the stays, and the plate members, with the threaded ends positioned between the legs. Nuts, threaded onto the threaded ends of the bolts, are provided for securing the bolts and are nonrotatably secured relative to the plate members.

16 Claims, 1 Drawing Sheet

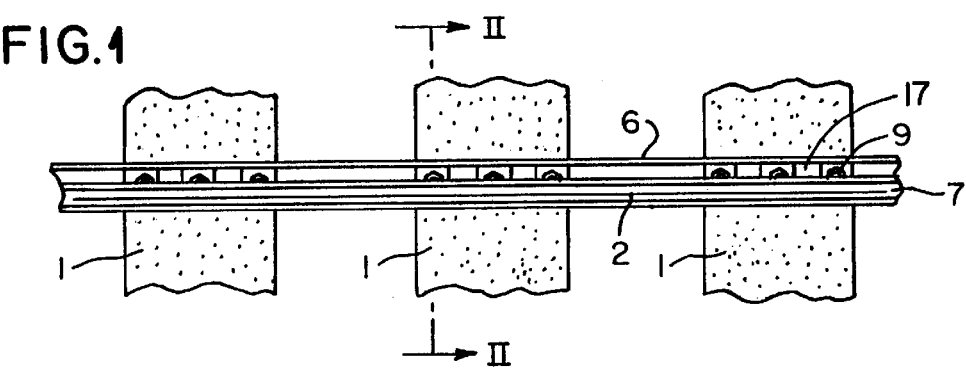
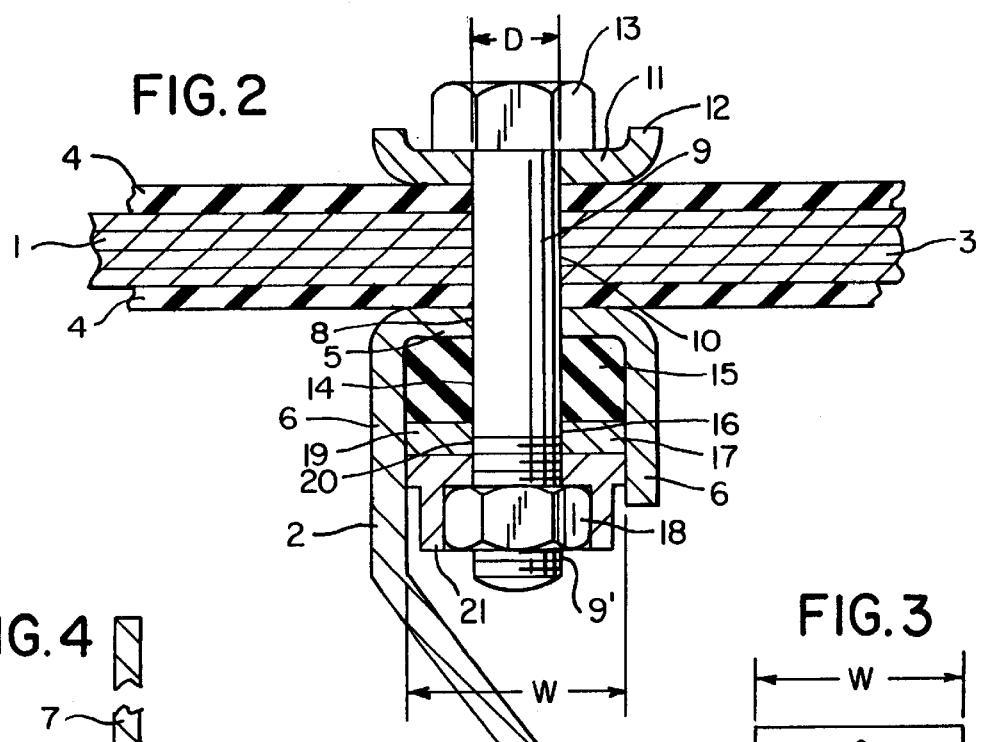
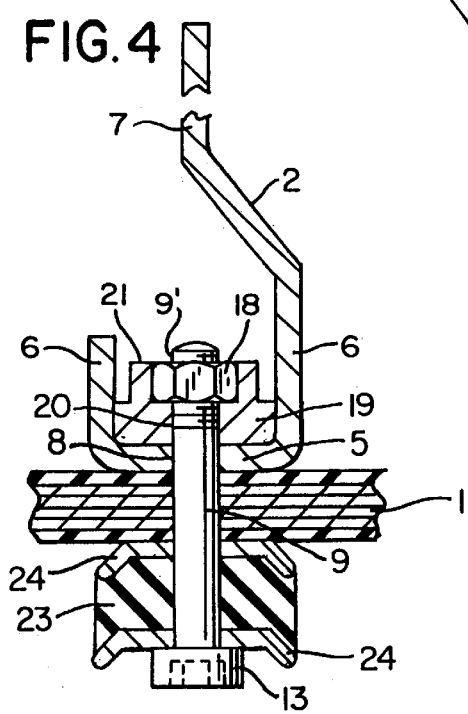
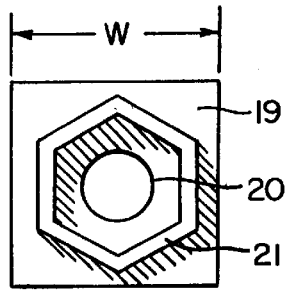
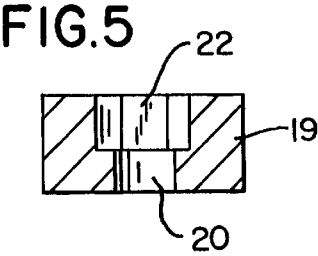

ROLLER BELT ARRANGEMENT FOR ENDLESS TRACK VEHICLES ESPECIALLY SNOWMOBILES

BACKGROUND OF THE INVENTION

The present invention relates to a roller belt arrangement for CATERPILLAR (endless track) vehicles, especially snowmobiles, with one or more parallel extending, pull-resistant, circulating belts to which are connected transverse drive members by bolts, having a head and a threaded end, penetrating the belts and the U-shaped foot of the drive members and secured by a threaded nut screwed onto the threaded end. The two legs of the U-shaped foot extend substantially perpendicularly to the belts and the connecting stay faces the belts. Furthermore, between the legs a plate member is provided that is penetrated by the bolts.

Especially for such roller belt arrangements in which the drive members are connected to the individual belts by interposition of cushion members, it is frequently necessary to tighten the aforementioned bolts whereby, in general, the head of the bolt positioned within the roller belt arrangement must be rotated by a tool. It is understood that under these conditions an undesired rotation of the element (nut) positioned between the two legs of the drive member foot cannot be prevented. A tool for securing the element is practically not usable because of the tight spatial conditions, especially when the outer portions of the roller belt arrangement are iced over.

Accordingly, it is an object of the present invention to provide a bolt arrangement with which the unwanted rotation of the nut secured to the threaded end of the bolt can be prevented.

SUMMARY OF THE INVENTION

A roller belt arrangement for a CATERPILLAR (endless track) vehicle according to the present invention is primarily characterized by:

At least one pull-resistant belt having a first surface and a second surface opposite the first surface;

Drive members connected to the first surface of the at least one pull-resistant belt and extending transversely to the longitudinal extension of the at least one pull-resistant belt;

The drive members having a U-shaped foot comprising a stay and two legs, wherein the stay rests on the first surface and the legs project perpendicularly from the first surface;

Bolts, having a head and a threaded end opposite the head, for connecting the drive members to the at least one pull-resistant belt;

Plate members non-rotatably positioned between the legs;

The bolts penetrating the at least one belt, the stays, and the plate members, with the threaded ends positioned between the legs;

Nuts, threaded onto the threaded ends of the bolts, for securing the bolts, wherein the nuts are non-rotatably positioned relative to the plate members.

Preferably, the plate member has a receiving space for receiving the nut, wherein the receiving space matches the shape of the nut.

The plate member has preferably a hole through which the bolt extends and a projection surrounding the hole at a distance, wherein the projection delimits the receiving space.

The receiving space is preferably a depression in the plate member.

Advantageously, the receiving space is hexagonal in cross-section.

In one embodiment of the present invention, the drive member further comprises an elastic cushion member and a metal strip, wherein the elastic cushion member and the metal strip are positioned between the stay and the plate member and wherein the elastic cushion member faces the stay and the metal strip faces the plate member.

In another embodiment, the drive member may comprise a metal-strip-covered cushion member positioned on the second surface between the head of the bolts and the second surface. The plate members rest on the stays.

The drive members are preferably elastically connected to the at least one pull-resistant belt.

The plate member is expediently a shaped body consisting of a tenacious, hard plastic material.

The drive members are preferably connected with at least two bolts to each one of the pull-resistant belts, and each of the bolts has correlated therewith one of the plate members.

According to the present invention, an element provided at the threaded end of the bolt, i.e., a nut, is non-rotatably positioned relative to the plate member positioned between the two legs and the plate member is non-rotatably positioned relative to the drive member and its two legs.

Accordingly, upon rotation of the bolt, the element (the nut) cannot be rotated relative to the plate member and the plate member, on the other hand, cannot be rotated relative to the drive member or its two legs. The element can engage positively-lockingly a receiving space of the plate member. For example, when the nut is a hexagon nut, the receiving space can be shaped hexagonally. The plate member should have a width which corresponds to the distance between the two legs such that a rotation of the plate member between the two legs is impossible.

BRIEF DESCRIPTION OF THE DRAWING

The object and advantages of the present invention will appear more clearly from the following specification in conjunction with the accompanying drawings, in which:

FIG. 1 shows a longitudinal portion of a roller belt arrangement for a CATERPILLAR (endless track) vehicle for use in snow, showing a view onto the running surface of the roller belt arrangement;

FIG. 2 shows a section along the line II—II of FIG. 1;

FIG. 3 shows a rotational securing device in the form of a plate member for the roller belt arrangement of FIG. 2 in a plan view;

FIG. 4 shows a modified attachment of the drive member relative to the representation of FIG. 2;

FIG. 5 shows a rotational securing device in the form of a plate member for a fastening action according to FIGS. 2 and 4 in a cross-sectional view.

DESCRIPTION OF PREFERRED EMBODIMENT

The present invention will now be described in detail with the aid of several specific embodiment utilizing FIGS. 1 through 5.

The running surface of the roller belt arrangement is formed by a plurality of pull-resistant, bendable, circulating belts 1. They are guided at the vehicle about guide wheels and serve for securing thereat transversely arranged drive members 2 which ensure propelling in snow and, in general, extend over the entire width of the roller belt arrangement so as to bridge the distances between neighboring belts 1. The belts 1 have a pull-resistant core 3 in the form of fabric layers which at the bottom and the top is provided with a cover layer 4 made of rubber.

The drive member 2 is comprised of a steel profile member with a U-shaped foot having a stay 5 that extends parallel to the belt 1 and two parallel legs 6 extending perpendicularly thereto. One of the legs 6 has an extension as a follower part 7. The stay 5 has three holes 8 for receiving bolts 9 which penetrate a hole 10 in the belt 1 and, at the inner side of the belts 1, a metal strip 11 with upwardly angled edges 12. At the outer side of the metal strip 11 the head 13 of the bolt 9 is arranged. The free threaded end of the bolt 9 is guided through centrally arranged holes 14 of a rubber strip 15 and through the holes 16 of a metal strip 17 which extends, like the rubber strip 15, over the entire width of the belt 1.

The gist of the invention is that for securing the nut 18 threaded onto the bolt 9, a plate member 19 with a central hole 20 is provided. The plate member 19 is arranged like a washer but is provided with an outwardly extending projection 21 the inner surface of which corresponds to the shape of the nut (hexagon nut) so that the nut 18 can be positive-lockingly received therein and rotation of the nut 18 relative to the plate shaped member 19 is prevented. Since the width w of the plate member 19 corresponds to the inner distance w between the two legs 6, the plate member 19 can also not rotate relative to the drive member 2.

When it is necessary to tighten the bolt 9 with its threaded end 9', for example, due to the undesired deformation of the rubber strip 15, this adjustment can be performed by turning the head 13 without causing the nut 18 to rotate also.

It should be mentioned that the plate member 19 may not only extend over the width of a single bolt, but over the entire width of the belt 1 so that a total of three holes 20, respectively, projections 21 are provided with one plate member. Furthermore, a cross-sectional shape according to FIG. 5 can be selected. The hole 20 provided thereat widens upwardly for receiving the nut 18. Receiving space 22 is delimited laterally by hexagonal surfaces. This embodiment and the embodiment according to FIGS. 2 and 3 are made of tenacious, hard plastic material (in the form of shaped bodies).

In the embodiment according to FIG. 4, the rubber cushion member in the form of a rubber strip 23 with adhered metal cover 24 is arranged at the inner side of the belt 1. The free end of the bolt 9 with threaded end 9' extends to the side of the running surface and penetrates stay 5 and a plate member 19 with surrounding projection 21 (embodiment according to FIG. 3) resting thereat. The projection 21 prevents by its form-locking connection to the head 13 a relative rotation, while the plate member 19, due to its design and size, can be secured non-rotatably between the two legs 6.

The present invention is, of course, in no way restricted to the specific disclosure of the specification and drawings, but also encompasses any modifications within the scope of the appended claims.

What is claim is:

1. A roller belt arrangement for an endless track vehicle, said roller belt arrangement comprising:
    at least one pull-resistant belt having a first surface and a second surface opposite said first surface;
    drive members connected to said first surface of said at least one pull-resistant belt and extending transversely to a longitudinal extension of said at least one pull-resistant belt;
    said drive members having a U-shaped foot comprising a stay and two legs, wherein said stay rests on said first surface and said legs project perpendicularly from said first surface;
    bolts, having a head and a threaded end opposite said head, for connecting said drive members to said at least one pull-resistant belt;
    a plate member provided for each one of said bolts;
    each one of said plate members non-rotatably positioned between said legs and having a side facing away from said stays;
    said bolts penetrating said at least one belt, said stays, and said plate members, with said threaded ends positioned between said legs;
    nuts, threaded onto said threaded ends of said bolts, for securing said bolts, wherein said nuts are non-rotatably positioned relative to said plate members on said side facing away from said stay;
    wherein each one of said plate members has a receiving space for receiving said nut, said receiving space matching a shape of said nut.

2. A roller belt arrangement according to claim 1, wherein said plate member has a hole through which said bolt extends and a projection surrounding said hole at a distance, wherein said projection defines said receiving space.

3. A roller belt arrangement according to claim 1, wherein said receiving space is a depression in said plate member.

4. A roller belt arrangement according to claim 1, wherein said receiving space is hexagonal in cross-section.

5. A roller belt arrangement according to claim 1, wherein said plate member is a shaped body consisting of a tenacious, hard plastic material.

6. A roller belt arrangement according to claim 1, wherein said drive members are connected with at least two of said bolts to each one of said pull-resistant belts.

7. A roller belt arrangement for an endless track vehicle, said roller belt arrangement comprising:
    at least one pull-resistant belt having a first surface and a second surface opposite said first surface;
    drive members connected to said first surface of said at least one pull-resistant belt and extending transversely to a longitudinal extension of said at least one pull-resistant belt;
    said drive members having a U-shaped foot comprising a stay and two legs, wherein said stay rests on said first surface and said legs project perpendicularly from said first surface;
    bolts, having a head and a threaded end opposite said head, for connecting aid drive members to said at least one pull-resistant belt;
    plate members non-rotatably positioned between said legs;
    said bolts penetrating said at least one belt, said stays, and said plate members, with said threaded ends positioned between said legs;
    nuts, threaded onto said threaded ends of said bolts for securing said bolts, wherein said nuts are non-rotatably positioned relative to said plate members;
    wherein said drive members further comprise an elastic cushion member and a metal strip, wherein said elastic cushion member and said metal strip are positioned between said stay and said plate member and wherein said elastic cushion member faces said stay and said metal strip faces said plate member.

8. A roller belt arrangement according to claim 7, wherein said plate member has a receiving space for receiving said nut, said receiving space matching a shape of said nut.

9. A roller belt arrangement according to claim 8, wherein said plate member has a hole through which said bolt extends and a projection surrounding said hole at a distance, wherein said projection delimits said receiving space.

10. A roller belt arrangement according to claim 8, wherein said receiving space is a depression in said plate member.

11. A roller belt arrangement according to claim 8, wherein said receiving space is hexagonal in cross-section.

12. A roller belt arrangement for an endless track vehicle, said roller belt arrangement comprising:

at least one pull-resistant belt having a first surface and a second surface opposite said first surface;

drive members connected to said first surface of said at least one pull-resistant belt and extending transversely to a longitudinal extension of said at least one pull-resistant belt;

said drive members having a U-shaped foot comprising a stay and two legs, wherein said stay rests on said first surface and said legs project perpendicularly from said first surface;

bolts, having a head and a threaded end opposite said head, for connecting aid drive members to said at least one pull-resistant belt;

plate members non-rotatably positioned between said legs;

said bolts penetrating said at least one belt, said stays, and said plate members, with said threaded ends positioned between said legs;

nuts, threaded onto said threaded ends of said bolts for securing said bolts, wherein said nuts are non-rotatably positioned relative to said plate members;

wherein said drive members further comprise a metal-strip-covered cushion member positioned on said second surface between said head of said bolts and said second surface and wherein said plate members rests on said stays.

13. A roller belt arrangement according to claim 12, wherein said plate member has a receiving space for receiving said nut, said receiving space matching a shape of said nut.

14. A roller belt arrangement according to claim 13, wherein said plate member has a hole through which said bolt extends and a projection surrounding said hole at a distance, wherein said projection delimits said receiving space.

15. A roller belt arrangement according to claim 13, wherein said receiving space is a depression in said plate member.

16. A roller belt arrangement according to claim 13, wherein said receiving space is hexagonal in cross-section.

* * * * *